(12) United States Patent
Eusterbarkey

(10) Patent No.: US 9,766,158 B2
(45) Date of Patent: Sep. 19, 2017

(54) TEST BENCH AND METHOD FOR TESTING THE DRIVE TRAIN OF A WIND TURBINE

(71) Applicant: SENVION SE, Hamburg (DE)

(72) Inventor: Carsten Eusterbarkey, Simonsberg (DE)

(73) Assignee: Senvion SE, Hamburg (DE)

( * ) Notice: Subject to any disclaimer, the term of this patent is extended or adjusted under 35 U.S.C. 154(b) by 338 days.

(21) Appl. No.: 14/602,606

(22) Filed: Jan. 22, 2015

(65) Prior Publication Data

US 2015/0128726 A1    May 14, 2015

Related U.S. Application Data

(63) Continuation of application No. PCT/EP2013/001960, filed on Jul. 4, 2013.

(30) Foreign Application Priority Data

Jul. 23, 2012 (DE) .......................... 10 2012 212 844

(51) Int. Cl.
*G01L 1/02* (2006.01)
*G01M 13/02* (2006.01)
*F03D 17/00* (2016.01)

(52) U.S. Cl.
CPC ........... *G01M 13/027* (2013.01); *F03D 17/00* (2016.05); *F05B 2260/83* (2013.01); *Y02E 10/726* (2013.01)

(58) Field of Classification Search
CPC .. G01M 13/027; F03D 17/00; F05B 2260/83; Y02E 10/726
USPC .............. 73/116.01, 116.03, 862.528, 116, 2
See application file for complete search history.

(56) References Cited

U.S. PATENT DOCUMENTS

| 7,178,406 | B2 * | 2/2007 | Gonzalez ............ | G01M 99/008 73/856 |
| 7,362,225 | B2 * | 4/2008 | Rittmueller ......... | B60R 21/0152 340/562 |
| 7,938,017 | B2 | 5/2011 | Bisgaard | |
| 7,963,160 | B2 * | 6/2011 | Bisgaard ............ | G01M 5/0058 73/170.01 |

(Continued)

FOREIGN PATENT DOCUMENTS

| DE | 102010017456 A1 | 12/2011 |
| WO | 2007/140789 A1 | 12/2007 |

OTHER PUBLICATIONS

International Search Report dated Nov. 11, 2013 in corresponding International Patent Application No. PCT/EP2013/001960.

*Primary Examiner* — Max Noori
(74) *Attorney, Agent, or Firm* — Rankin, Hill & Clark LLP

(57) ABSTRACT

The invention relates to a test bench (1) for testing a drive train of a wind turbine, comprising a drive device (40) for introducing test power into the drive train, which can be detachably connected to a drive train to be tested. The invention further relates to a method for testing a drive train of a wind turbine by way of a test bench (1), and to a drive train of a wind turbine. The test bench (1) according to the invention is characterized in that the drive device (40) for testing a drive train is or will be fitted and mounted on or to the drive train so as to be removable, wherein most of the weight of the drive device (40) is borne by the drive train when the drive device (40) is fitted or mounted.

14 Claims, 1 Drawing Sheet

(56) References Cited

U.S. PATENT DOCUMENTS

Figure 1:
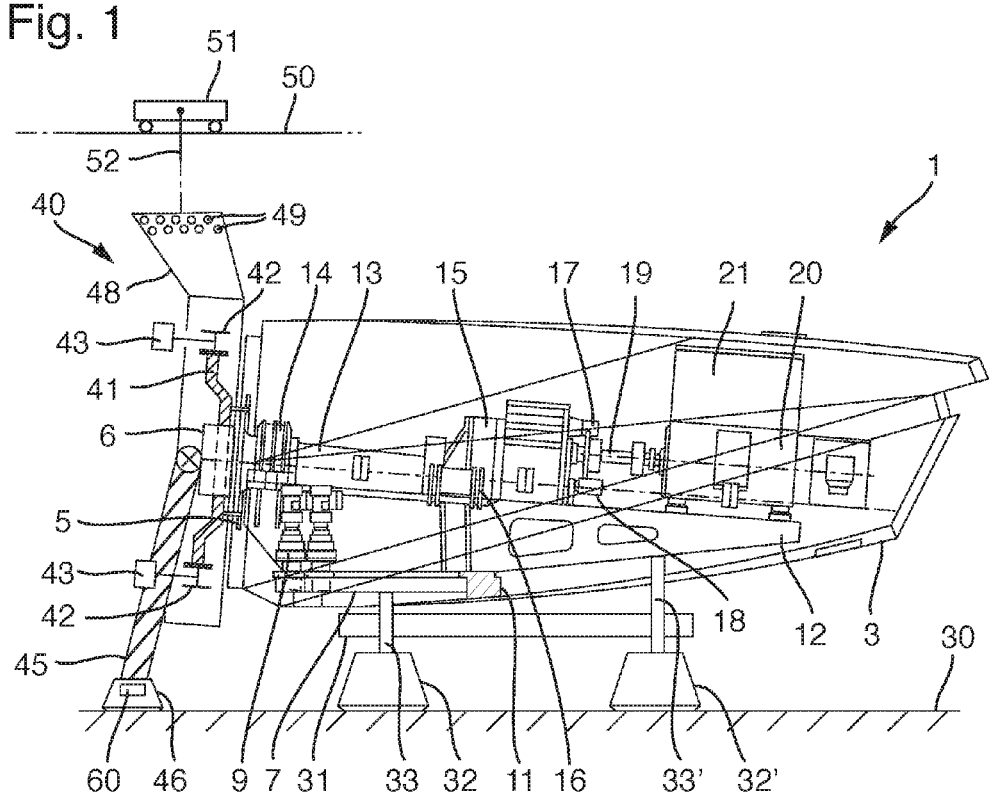

2005/0172729 A1 8/2005 Gonzalez et al.
2011/0023629 A1 2/2011 Bushey et al.

* cited by examiner

TEST BENCH AND METHOD FOR TESTING THE DRIVE TRAIN OF A WIND TURBINE

CROSS-REFERENCE TO RELATED APPLICATIONS

This application is a continuation of PCT/EP2013/001960, filed Jul. 4, 2013, and claims priority to German App. DE 10 2012 212 844.1, filed Jul. 23, 2012.

The invention relates to a test bench for testing a drive train of a wind turbine, comprising a drive device for introducing test power into the drive train, which can be detachably connected to a drive train to be tested. The invention further relates to a method for testing a drive train of a wind turbine using a test bench, and a drive train of a wind turbine.

In the field of constructing wind turbines, in some cases, components of a wind turbine, and particularly mechanical, electric and/or electronic components, are tested in a test bench before the wind turbine is installed and put into operation. Such test benches, which test the individual components of the wind turbine or also a completely assembled nacelle, or respectively a completely assembled machine housing, are also called end-of-line test benches. Along with control electronics, such test benches comprise one or more motors which transmit test power, or respectively torque, onto a drive train, in particular where the rotor is mounted in the completely installed wind turbine. Using such test benches, it can be tested in a test bench sequence whether the mechanical, electric and/or electronic components correspond to the predetermined reference values. The test bench sequence can last several hours, for example, up to 6 hours.

The components or machine housings, after testing in the test bench and passing the testing, are then transported to the installation site, and the wind turbine is mounted there.

A wind turbine test system is known from the document WO 2007/140789 A1, in which a drive train including electronics and generator are installed in a test stand, torque is exerted on the low speed shaft, and that additionally comprises an electric supply network simulation system such that testing is performed to determine if the wind turbine corresponds to different network conditions.

The known end-of-line test benches or test benches are stationary, anchored to the ground, and have drive devices which are connected to the item to be tested, thus to the drive train to be tested, by means of a flexible coupling. A corresponding test bench is known for example from the document WO 2007/140789 A1. Such end-of-line test benches are very complex and inflexible, and generally are adapted to only one type of drive train.

Ideally an entire machine nacelle is tested. With the wind turbines from the applicant marketed under the designations 5M and 6M, weighing more than 320 tons and having dimensions of approximately 6×19 m, such a nacelle is not very mobile. The preparation and testing in the test bench is correspondingly elaborate.

The object of the present invention is to provide a test bench and a method for testing a drive train of a wind turbine under realistic conditions with which it is possible to flexibly adapt to different types of wind turbines, wherein the constructive expenditure is to be kept low.

This object is solved by a test bench for testing a drive train of a wind turbine, comprising a drive device for introducing test power into the drive train, which can be detachably connected to the drive train to be tested, characterized in that for testing a drive train, the drive device is or will be mounted on or attached to and supported on the drive train so as to be removable, wherein most of the weight force of the drive device is borne by the drive train when the drive device is mounted or attached.

Thus, unlike the prior art, the test bench according to the invention is not anchored to the ground, but rather has a drive device that is preferably freely movable in the removed state, and that will be fitted to, mounted on or attached to the drive train for testing a drive train. Here, in addition, most of the weight force, thus in particular more than 50% of the weight force, of the drive device is mounted such that the weight is borne by the drive train.

In comparison to the usual procedure, where the drive device is connected to the item to be tested using a flexible coupling, this allows a significantly more realistic testing of the drive train.

In the scope of the invention, an individual drive train, thus a rotor shaft or a drive train without a rotor shaft, can be tested with possible further components, such as a transmission, a high speed shaft, etc., or is or are alone or is or are installed in a machine nacelle or a machine housing.

A drive flange of the drive train to which, or respectively on which, the drive device is fastened, serves for mounting or attaching the drive device on or to the drive train. The drive flange can be arranged, for example, on a rotor shaft and during operation of the wind turbine can be connected to a rotor hub, or with a drive without a rotor shaft can likewise serve for fastening to a rotor hub. The drive flange can alternatively also be a part of the rotor hub, which in this case belongs to the drive train to be tested. The drive unit can also engage in a suitable manner on the one or more flanges for the rotor blade or the rotor blades on the rotor hub.

Preferably the portion of the weight force of the drive device bearing, in the fitted state, on the drive train corresponds to a weight force of a rotor of the wind turbine. Thus, the drive train is tested under realistic conditions. The mobile test bench according to the invention, or respectively the drive device thereof, preferably has a weight that lies in the order of magnitude of, or somewhat more than, the weight of the rotor of the completely mounted wind turbine.

With modern wind turbines, for example the wind turbines marketed by the applicant under the type designations 5M or 6M, the machine housing weighs more than 300 tons. The rotor of the 5M weighs 130 tons. A compactly built, in particular a floatingly mounted, test drive with a weight of 50 to 150 tons is therefore significantly more mobile than a nacelle weighing more than 300 tons. Because the test bench has a significantly lower number of operating hours than the wind turbine, it can be significantly lighter and more compactly implemented than the wind turbine nacelle.

The weight, or respectively the inertial torque, of the drive acts preferably maximally such that it corresponds to the rotor of the smallest system to be tested. Where necessary, the mass is preferably adapted to larger rotors by trim weights. Thereby more realistic total masses, nacelle deformations and possibly even drive train inertias, can be simulated using the simulated rotor mass.

Alternatively, when the drive weighs more than the rotor of the smallest system to be tested, a portion of the weight is borne directly on the ground.

The bearing of the drive device on the drive train is preferably a floating bearing. Thus, the drive train is not needlessly or excessively loaded axially. This contributes also to protecting the drive train.

The particular advantage with the floating bearing consists in that the time-consuming precise alignment of the drive unit to the drive train is omitted.

Intermediate flanges are advantageously provided for different systems. This allows the test bench to be used flexibly when the systems have different flanges.

The drive device preferably has a large gear that can be placed on a drive flange, and one or more pinions which engage on or in the circumference of the large gear in an external or internal toothing of the large gear. The pinions are preferably distributed uniformly about the circumference of the large gear. Due to the plurality of pinions, each pinion participates in only a small part of the introduction of the test power, or respectively the test torque on the large gear, and thus the drive train. This spares the material of the drive device from damage. Likewise in this manner, uniform loading is attained in the peripheral direction, wherein imbalances, which are damaging for the drive device and the item to be tested, are avoided.

Alternatively, it is also preferred to provide an electric direct drive without gearing.

The drive device preferably has one or more, in particular hydraulic or electric, drive motors. With hydraulic drive motors, preferably one stationary hydraulic unit is provided for supplying the hydraulic drive motors.

The drive motors preferably each act upon one pinion, wherein the drive motors are synchronized, in particular by means of a hydraulic ring line or using an electronic control. A hydraulic ring line, which interconnects the hydraulic drive motors, ensures that a test power is distributed uniformly about the circumference. An electronic control, which synchronizes the electric motors, can also be used according to the invention. In particular, it can detect and reduce increased load states of individual electric motors and compensate them using the other electric motors such that the load acting is homogenized.

The drive device advantageously comprises a torque support, which in particular has two legs supporting it on the ground. This torque support, on the one hand, supports the smaller portion of the weight force of the drive device with respect to the ground and absorbs the torque, which is exerted by the drive device on the item to be tested.

The torque support preferably has a forced load compensation, in particular, a crossfeed-hydraulic or piezo element. The introduction of torque without forced load means that no transverse forces are introduced into the structure through the necessary support of the torque on the ground, such that the drive train is not deformed or loaded by a radial displacement of the drive device due to the effect of the introduced testing torque. This is preferably achieved using a crossfeed-hydraulic, with which two hydraulic cylinders are connected together crosswise in the force flow of the torque support such that they can only absorb two opposing forces of equal amount, so that the sum of forces is always zero. Thus, a freedom from transverse forces results. The freedom from forced or compulsory load, or respectively freedom from compulsory force serves to protect the item to be tested from damage. The item to be tested is therefore not already damaged during the test. Instead of a crossfeed-hydraulic, a forced load compensation can occur advantageously also using piezo elements which are highly loadable and can be rapidly controlled.

If the machine nacelle is sufficiently heavy, the transport support of the nacelle can suffice for supporting the drive train torque in an advantageously simple implementation. Otherwise, using suitable constructive measures, e.g., by enlarging the contact area, ensures a safe introduction of the torque into the ground.

In an advantageous further development, the drive device has a retaining apparatus, on which the drive device can be suspended, wherein the retaining apparatus has, in particular, a plurality of retaining openings or an elongated hole, in particular with latching positions for a lifting tool or another lifting means, by means of which an axis inclination of the drive device can be adjusted in the suspended state. Using the retaining apparatus it is possible to freely move the drive device of the test bench, for example in a test hall on a ceiling rail system, which has a high bearing load, and to bring the drive device from one drive train to the next without moving the drive trains or nacelles themselves. The axis inclination can be adjusted preferably between 0° and 10°, in particular between 4° and 7°.

The feature, that the retaining apparatus has a plurality of retaining openings for a lifting tool or another lifting means or a corresponding elongated hole provided with latching positions, means that depending on which retaining opening is used for the lifting tool, the center of gravity of the drive device is located at a different location beneath the selected retaining opening such that the drive device with each retaining opening has a different axis inclination. The retaining openings or latching positions are arranged in particular such that predetermined axis inclinations of known drive train types and, in particular, nacelle types of different wind turbine types can be adjusted. The drive device of the test bench according to the invention can then be lifted such that it already has the correct axis inclination, and thus can be placed precisely flush on the drive train of the wind turbine to be tested.

The drive device according to the invention of the test bench according to the invention can be used independent of the axis of inclination of the system to be tested and does not require any large stationary test bench structures. The test bench is flexible in its use and can, if necessary, be already preinstalled, while the space for the test bench is still occupied by another item to be tested.

Using the mobile test bench according to the invention, testing of a drive train can be performed, if necessary in the nacelle, even on-site, if the drive unit is placed on the drive train by means of a crane. Here, energy supply and torque support are to be implemented. With large offshore projects, it is even possible to perform the desired end-of-line test at the quay of a harbor with appropriate infrastructure.

The test bench according to the invention requires an existing infrastructure with respect to the electrical, or respectively hydraulic, energy supply thereof, also if necessary, a grid connection into which the generator of the item to be tested feeds the energy. A closed circuit is also possible in which the majority of the required drive energy is provided by the generator of the tested wind turbine.

The object underlying the invention is also solved by a method for testing a drive train of a wind turbine with a test bench, which in particular is developed according to the invention as described above, that is characterized in that a drive device of the test bench is mounted on or attached to a drive train, wherein with the support, most of the weight force of the drive device is borne by the drive train. Here, the drive device is formed, in particular, preferably freely movable. The method has same advantages, features and properties as the test bench according to the invention.

Advantageously the portion of weight force of the drive device borne by the drive train corresponds to the weight force of a rotor of the wind turbine. Thus, a nearly realistic simulation of the wind turbine operation is possible.

The method according to the invention likewise permits in an advantageous manner that the testing with the drive device occurs on a plurality of drive trains, wherein in each case the drive device is moved from a tested drive train to a drive train to be tested.

The object addressed by the invention is finally solved by a drive train of a wind turbine which is characterized in that it has been tested by means of a previously described method according to the invention and/or by means of a previously described test bench according to the invention. This drive train has therefore withstood testing under realistic load conditions and thus has a lower probability for failure than drive trains tested in conventional stationary test benches. A wind turbine, which has a corresponding drive train according to the invention also solves the object underlying the invention.

Further characteristics of the invention will become apparent from the description of the embodiments according to the invention together with the claims and the included drawings. Embodiments according to the invention can fulfill individual characteristics or a combination of several characteristics.

Figure 2:
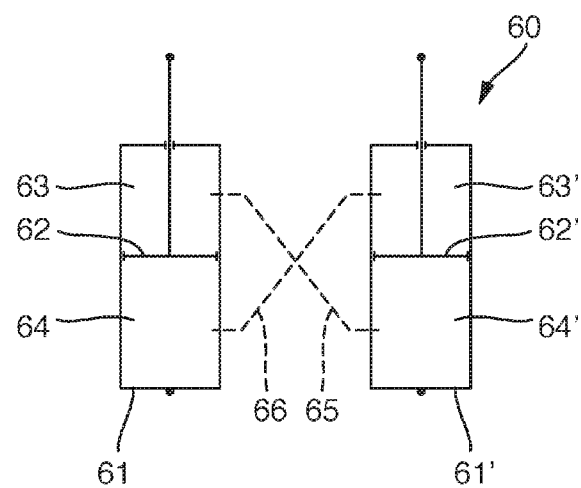

The invention is described below, without restricting the general intent of the invention, based on exemplary embodiments in reference to the drawings, whereby we expressly refer to the drawings with regard to the disclosure of all details according to the invention that are not explained in greater detail in the text. The figures show:

FIG. 1 a schematic cross-sectional representation through a nacelle of a wind turbine with a test bench according to the invention placed thereupon, and FIG. 2 a schematic representation of a crossfeed-hydraulic.

In the drawings, the same or similar types of elements and/or parts are provided with the same reference numbers so that a corresponding re-introduction can be omitted.

FIG. 1 shows a cross-sectional representation through a nacelle 3 in a known wind turbine, for example the wind turbine MD70 of the applicant. The nacelle 3 houses a machine support 12, which is connected to a top-of-tower rotating assembly 7. Azimuth adjustment motors 9 of an azimuth adjustment engage on the top-of-tower rotating assembly 7, and after installation and commissioning align the nacelle 3, or respectively the rotor, in the direction of the prevailing wind direction. Four azimuth adjustment motors 9 are present for this purpose, two of which are arranged on the represented side, and two of which are hidden from view on the other side of the machine support 12. Azimuth brakes 11, which serve for stopping the azimuth adjustment of the rotor, also engage on the top-of-tower rotating assembly 7.

The drive train to be tested begins with a rotor shaft 13, which is rotatably mounted in a rotor bearing 14 formed as a roller bearing. With the wind turbine MD70 of the applicant, the rotor bearing 14 is formed as a fixed bearing that only permits a few millimeters of play in the axial direction of the rotor shaft 13. The rotor shaft 13 drives a transmission 15, which converts the low-speed rotational movement of the rotor shaft into a high-speed rotational movement of a generator shaft 19, which is represented with couplings, the generator shaft 19 driving in turn a generator 20 for generating electricity, being equipped with a heat exchanger 21.

The transmission 15 also has a rotor brake 17 and a slip ring carrier 18, as well as two elastic transmission suspensions, or respectively supports 16, one of which is shown in FIG. 1, whereas the other is located symmetrically on the other side of the transmission 15 and thus is hidden from view by transmission 15.

The support, or respectively the elastic transmission suspension 16, is built conventionally and is comprised of hollow shaft elastomer bodies of two semi-cylindrical partial bodies which are arranged around a cylindrical bolt. The suspension 16 is a floating bearing with the cylindrical bearings thereof, the cylinder axis of which is aligned parallel to the rotor shaft 13, because due to its suppleness in this direction it absorbs only a small amount of rotor thrust in the direction of the rotor shaft axis.

The nacelle 3 is arranged for testing on a bearing frame 31 and is securely supported by means of feet 32, 32' and bolts 33, 33' with respect to the ground.

A drive device 40 of a test bench 1 according to the invention sits on a drive flange 5 arranged on the rotor shaft 13. A pitch cabinet 6, for blade adjustment, is fastened to the drive flange 5. The drive device has in a housing a large gear 41 that is placed on the drive flange 5 of the rotor shaft 13. A rotation of the large gear 41 leads therefore also to a rotation of the drive train. A plurality of pinions 42, thus small gears, are uniformly distributed about the circumference of the large gear 41, the gears of which act on the gears of the large gear 41. Each pinion is provided with a motor 43 that drives the pinion 42. The motors 43 can be electric or hydraulic. In the sectional representation in FIG. 1 there are only two pinions 42 and drive motors 43 shown, it is however customary to use a plurality of drive motors 43.

The drive motors require an energy supply, not shown, e.g. by means of electrical cables or hydraulic high pressure hoses. The claimed characteristic "freely movable" includes that the energy supply can lead to limitations, e.g. due to the cable tube lengths. Functionally however, the drive device 40 is movable and rotatable in all directions with respect to the item to be tested.

The housing, or respectively the drive device 40, has a torque support 45, which rests on the ground 30 using a foot 46 or support foot. This torque support 45 ensures that the torque, which is transmitted by the large gear 41 to the drive train in the nacelle 3, is dissipated to the ground 30. The torque support additionally has a crossfeed-hydraulic 60, which prevents a radial displacement and effects a compulsory or forced load compensation.

The drive device 40 further has a retaining apparatus 48 on the upper end thereof, in the upper region of which a plurality of retaining openings 49 are arranged next to each other. The retaining openings 49 serve for receiving a support hook of a lifting tool 52 such that the drive device 40 can be held and moved by a lifting crab 51 on a support rail 50, using the lifting tool 52. Different retaining openings 49 are arranged at different positions in the longitudinal direction so that a specific axis inclination of the drive device 40 is set by selecting a specific retaining opening 49. With this, the axis inclination can be adapted already before coupling at a drive train in a type appropriate manner to the axis inclination of the drive train in the respective machine housing.

Overhead cranes with chains, steel cables or crane belts can be provided as a lifting tool. Alternatively however trolleys with appropriate adjustment devices can also be provided for lifting and angle adjustment. This is particularly advantageous when no overhead crane with sufficient bearing load is available.

FIG. 2 schematically shows the principle of a crossfeed-hydraulic 60. This comprises two hydraulic cylinders, or respectively hydraulic cylinders 61, 61' each having a plunger 62, 62', which respectively divides the interior of the hydraulic cylinders 61, 61' into an upper partial volume 63, 63' and a lower partial volume 64, 64'. The plungers are pressurized from above each with the force, which for example pressurizes the weight force or the respective force which results from the torque from the drive device 40. Thereby, both plungers 62, 62' are pressed downward and the lower partial space 64, 64' is respectively reduced.

There are hydraulic lines 65, 66 between the upper partial volume 63 of the hydraulic cylinder 61 and the lower partial volume 64' of the hydraulic cylinder 61' on the one side, and the lower partial volume 64 of the hydraulic cylinder 61 and the upper partial volume 63' of the hydraulic cylinder 61' on the other side, through which the hydraulic fluid in the respective partial volumes, connected together, communicate with each other. This results in the fact that an increased pressure on for example the plunger 62 of the hydraulic cylinder 61 leads to a further reduction of the lower partial volume 64. Using the connection line 66, this pressure is further conducted on to the plunger 62' in the hydraulic cylinder 61', which is likewise further loaded. With this, for example, a torque can be compensated acting in such a manner that the torque intends to actually move the plunger 62' upwards. Thus, this crossfeed-hydraulic acts in that a radial displacement that is generated by the torque of the drive device 40 is prevented and the drive device 40 is not moved with respect to the drive train. This crossover also causes the sum of the absorbed forces to be zero.

All named characteristics, including those taken from the drawings alone, and individual characteristics, which are disclosed in combination with other characteristics, are considered individually and in combination as essential to the invention. Embodiments according to the invention can be fulfilled through individual characteristics or a combination of several characteristics.

REFERENCE LIST 1 test bench
3 nacelle
5 drive flange
6 pitch cabinet
7 top-of-tower rotating assembly
9 azimuth adjustment motors
11 azimuth brakes
12 machine support
13 rotor shaft
14 rotor bearing
15 transmission
16 elastic transmission suspension
17 rotor brake
18 slip ring carrier
19 generator shaft with couplings
20 generator
21 heat exchanger
30 ground
31 bearing frame
32, 32' foot
33, 33' bolt
40 drive device
41 large gear
42 pinion
43 drive motor
45 torque support
46 foot
48 holding apparatus
49 holding opening
50 support rail
51 lifting crab
52 lifting tool
60 crossfeed-hydraulic
61, 61' hydraulic cylinder
62, 62' plunger
63, 63' upper partial volume
64, 64' lower partial volume
65, 66 hydraulic line

The invention claimed is:

1. A test bench for testing a drive train of a wind turbine, comprising a drive device for introducing test power into the drive train, wherein the drive device is configured to be detachably connected to the drive train to be tested, wherein for testing the drive train the drive device is mounted on or attached to and supported on the drive train so as to be removable, and wherein most of a weight force of the drive device is borne by the drive train when the drive device is mounted on or attached to and supported on the drive train.

2. The test bench according to claim 1, wherein the drive device in a removed state is freely movable.

3. The test bench according to claim 1, wherein when the drive device is mounted on or attached to and supported on the drive train the weight force of the drive device borne by the drive train corresponds to a weight force of a rotor of the wind turbine.

4. The test bench according to claim 1, wherein a bearing of the drive device on the drive train is a floating bearing.

5. The test bench according to claim 1, wherein the drive device has a gear configured for placement on a drive flange, and one or more pinions, which engage on or in a circumference of the gear in an external toothing or internal toothing of the gear.

6. The test bench according to claim 1, wherein the drive device has one or more hydraulic or electric drive motors.

7. The test bench according to claim 6, wherein the drive motors each act on a pinion, wherein the drive motors are synchronized by a hydraulic ring line or using an electronic control.

8. The test bench according to claim 1, wherein the drive device comprises a torque support, which has two support feet supported on the ground.

9. The test bench according to claim 8, wherein the torque support has a forced load compensation comprising crossfeed-hydraulic or piezo elements.

10. The test bench according to claim 1, wherein the drive device has a retaining apparatus on which the drive device is suspended, wherein the retaining apparatus has a plurality of retaining openings or an elongated hole having latching positions for a lifting tool by means of which an axis inclination of the drive device can be adjusted when the drive device is suspended.

11. A method for testing a drive train of a wind turbine with a test bench according to claim 1, comprising detachably mounting or attaching a drive device of the test bench on or to the drive train such that most of a weight of the drive device is borne by the drive train.

12. The method according to claim 11, wherein when the drive device is mounted on or attached to the drive train the weight of the drive device borne by the drive train corresponds to a weight of a rotor of the wind turbine.

13. The method according to claim 11, wherein testing with the drive device occurs on a plurality of drive trains, and wherein in each case the drive device is moved from a tested drive train to a drive train to be tested.

14. A drive train of a wind turbine that has been tested using a method according to claim 11.

* * * * *